(12) United States Patent
Noda et al.

(10) Patent No.: US 6,184,929 B1
(45) Date of Patent: Feb. 6, 2001

(54) SOLID STATE IMAGING DEVICE AND IMAGE READ APPARATUS WITH POLYGONAL PHOTOSENSITIVE PIXELS

(75) Inventors: Satoshi Noda; Izumi Takashima; Hisahiro Takahagi, all of Ebina (JP)

(73) Assignee: Fuji Xerox Co., Ltd., Tokyo (JP)

( * ) Notice: Under 35 U.S.C. 154(b), the term of this patent shall be extended for 0 days.

(21) Appl. No.: 08/785,273

(22) Filed: Jan. 21, 1997

(30) Foreign Application Priority Data

Dec. 11, 1990 (JP) .................................................. 8-331222
Jan. 27, 1996 (JP) .................................................. 8-010403

(51) Int. Cl.$^7$ .............................. H04N 3/14; H04N 5/225
(52) U.S. Cl. ...................... 348/315; 348/275; 348/280; 348/324; 348/342; 358/483
(58) Field of Search .................................. 382/162, 167, 382/199, 312; 358/518, 530, 533; 348/262, 265, 266, 267, 272, 273, 275, 277, 280, 294, 311, 315–317, 320–324, 241, 242, 250

(56) References Cited

U.S. PATENT DOCUMENTS

| 4,471,387 | * | 9/1984 | Nadler | 348/315 |
| 5,031,032 | * | 7/1991 | Perregaux | 348/275 |
| 5,055,921 | * | 10/1991 | Usui | 348/275 |
| 5,119,181 | * | 6/1992 | Perregaux | 348/315 |
| 5,351,309 | * | 9/1994 | Lee | 382/199 |
| 5,552,828 | * | 9/1996 | Perregaux | 348/315 |
| 5,793,071 | * | 8/1998 | Sekine | 257/240 |
| 5,956,085 | * | 9/1999 | Chien | 348/275 |
| 5,956,087 | * | 9/1999 | Takayama | 348/275 |

FOREIGN PATENT DOCUMENTS

| 59-181568 | 10/1984 | (JP) | H04N/5/30 |
| 5-5719 | 2/1993 | (JP) | H04N/1/028 |
| 7-66948 | 3/1995 | (JP) | H04N/1/19 |

* cited by examiner

Primary Examiner—Wendy Garber
Assistant Examiner—Ngoc-Yen Vu
(74) Attorney, Agent, or Firm—Oliff & Berridge PLC.

(57) ABSTRACT

A solid state imaging device comprising:
a plurality of photosensitive pixels for scanning an optical image signal falling thereon and converting the same photoelectrically which are arranged in parallel to one another in a main scan direction,
wherein the photosensitive pixels are respectively formed in a triangle or in a trapezoid, the two mutually adjoining ones of the photosensitive pixels are positioned in point symmetry in which the two mutually adjoining photosensitive pixels are rotated in 180° about a point from each other, and the oblique sides of the two mutually adjoining photosensitive pixels are opposed to and in contact with each other.

13 Claims, 17 Drawing Sheets

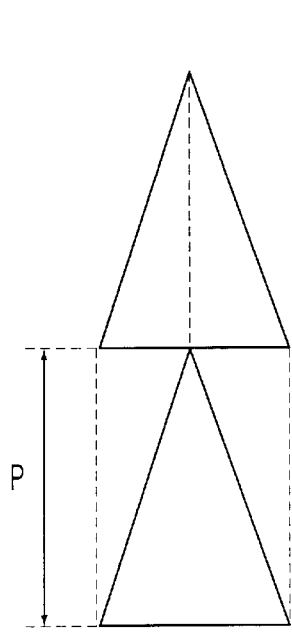
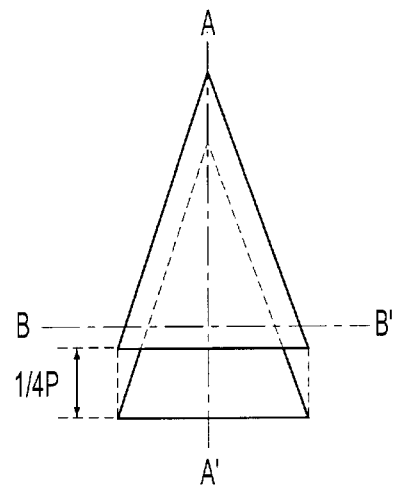
IN CASE OF 100%        IN CASE OF 400%
FIG. 4A                FIG. 4B
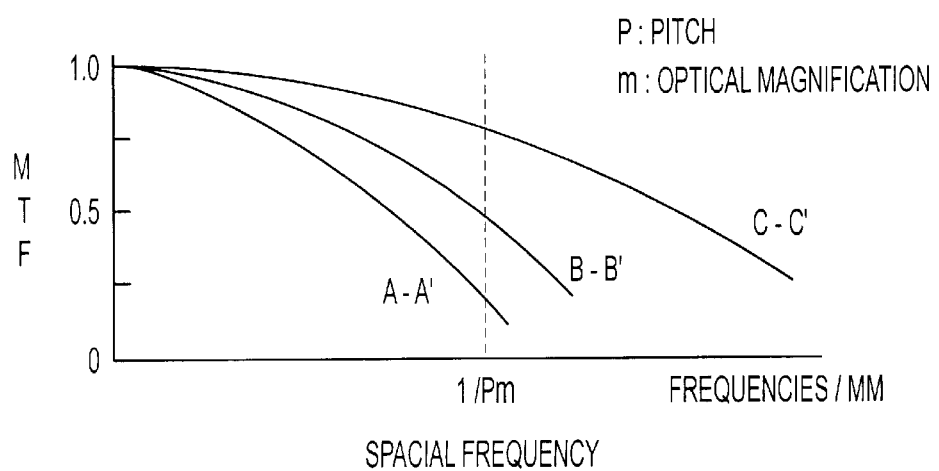
FIG. 5

IN CASE OF 100%

IN CASE OF 400%

SOLID STATE IMAGING DEVICE AND IMAGE READ APPARATUS WITH POLYGONAL PHOTOSENSITIVE PIXELS

BACKGROUND OF THE INVENTION

The present invention relates to a solid state imaging device which is used to optically scan and read an image of a manuscript mainly in an image forming apparatus such as a copying machine or the like, and an image read apparatus using the present solid state imaging device.

As an image read apparatus for use in the above-mentioned copying machine, there is known an image read apparatus of a type that the image of a manuscript placed on a platen glass is scanned by an optical scanner, an image optical signal which is a reflected light from the manuscript image generated when it is scanned by the optical scanner is image formed by a lens on a solid state imaging device such as a CCD or the like, and the reflected light is scanned and converted photoelectrically into an electric image signal by the solid state imaging device, before it is output from the present image read apparatus. In the present solid state imaging device, a plurality of photosensitive pixels are arranged in point order in a main scanning direction crossing at right angles to the scanning direction of the optical scanner; for example, if a copying machine in which the present solid state imaging device is used is of a type that it can deal with full colors, then there are arranged a plurality of photosensitive pixel lines, each line including more than one set of three photosensitive pixels (R: red, G: green, B: blue) which are respectively able to separate the three primary colors, that is, red, green, and blue.

In the copying machine of a full-color type, since the size of the photosensitive pixel per color is decreased down to a third or so when compared with a normal monochrome type of copying machine, the MTF (Modulation Transfer Function) thereof in the main scanning direction is increased up to a high frequency. As conventionally known, the thus increased MTF results in the deteriorated image quality such as a moire, folding distortion, coloring, a blur and the like. In view of this, in the Unexamined Japanese Patent Application Publication No. Sho. 59-181568, there is disclosed a technology in which a photosensitive pixel is formed in a parallelogram shape to thereby lower the MTF of the photosensitive pixel in the main scanning zero-degree direction thereof so as to reduce the deterioration of image quality. Also, in the Examined Japanese Utility Model Publication No. Hei. 5-5719, there is disclosed a solid state imaging device in which there are arranged a plurality of photosensitive pixels each having a diamond shape.

Also, in the image read apparatus, in order to prevent the above-mentioned image deterioration effectively, an optical lowpass filter (a diffraction grating) is interposed between a lens and a CCD. For example, in the Unexamined Japanese Patent Application Publication No. Hei. 7-66948, there is proposed a technology in which between a lens and a CCD there are arranged a plurality of lowpass filters each having a linear pattern in such a manner that their linear patterns are oriented in mutually different directions to thereby remove interference patterns, which are caused to occur when diffracted lights generated from the lowpass filters interfere with each other, so as to obtain an image of high quality. Also, in some cases, the lowpass filters are not interposed between the lens and CCD but they are interposed between the manuscript and lens. Further, as the lowpass filter, a crystal plate can also be used.

According to the technology disclosed in the above-mentioned Japanese Patent Application Publication No. Sho. 59-181568, like a copying machine, in an image read apparatus which scans an optical signal not only in a main scan direction but also in a direction crossing at right angles to the main scan direction, as shown in FIGS. 28a and 28b, the reading range thereof is moved in a sub-scan direction (in FIGS. 28a and 28b, in the vertical direction) and the value of the integration thereof provides the image data. FIG. 28A shows an integration area when a copy image is 100%, while FIG. 28B shows an integration area when a copy image is enlarged by 400%. In enlargement, the scan distances of two scanners 11 and 12 are reduced in inverse proportion to the enlargement ratios, with the result that the scan distance in the sub-scan direction is shorter than when a copy image is 100%. In this case, the integration area provides a narrow parallelogram and, therefore, as described above, the MTF in the main scan zero-degree direction can be reduced, whereas the MTF in a C–C' direction crossing at right angles to an oblique side A–A' direction still remains high. Especially, in a copying machine of an ordinary type that the adjustment of the reading magnification (so called, to reduce/enlarge an image) in the sub-scan direction is controlled according to the scan speed of a scanner, when reading the image on an enlarged scale, the scan distance thereof is shortened in inverse proportion to the scan speed, with the result that the MTF in the above-mentioned C–C' direction is increased remarkably. That is, since the MTFs in the A–A' direction and C–C' direction are different greatly from each other, the quality of an image formed can be deteriorated in the specific direction of the image.

According to the above-mentioned Japanese Utility Model Publication No. Hei. 5-5719, although it is possible to prevent an image from being deteriorated in the image quality thereof in the specific direction of the image, if the photosensitive pixels thereof are arranged in point order, then the resolution thereof in the main scan direction is reduced down to a third. Also, since the photosensitive pixels are arranged in two lines which are shifted from each other, there is necessary a correction circuit in the sub-scan direction, which makes it impossible to have the merit of the point order arrangement that the structure can be simplified.

Further, in the above-mentioned Japanese Patent Application Publication No. Hei. 7-66948, not only because a high precision is required when manufacturing the diffraction gratings but also because a high mounting precision is required when they are mounted, there arise a problem that the manufacturing cost of the diffraction gratings is high and it is not easy to assemble the diffraction gratings. Also, when the diffraction gratings are interposed between the manuscript and lens, the cycles of the diffraction gratings must be set large but actually a sufficient cycle cannot be obtained due to its relationship with respect to the diameter of a luminous flux, with the result that the diffraction gratings are not able to provide satisfactory performance.

SUMMARY OF THE INVENTION

The present invention aims at eliminating the drawbacks found in the above-mentioned conventional solid state imaging device and image read apparatuses using such solid state imaging device. Accordingly, it is an object of the invention to provide a solid state imaging device and an image read apparatus which are able to reduce effectively the deterioration of the image quality of an image formed, such as a moire, folding distortion, coloring, a blur and the like, and are thereby able to provide an image of high quality.

In attaining the above object, according to the invention, there is provided a solid state imaging device in which that a plurality of photosensitive pixels for scanning an optical image signal falling thereon and converting the same photoelectrically are arranged in parallel to one another in a main scan direction, characterized in that the photosensitive pixels are respectively formed in a triangle or in a trapezoid, the two mutually adjoining ones of the photosensitive pixels are positioned in point symmetry in which the two mutually adjoining photosensitive pixels are rotated in 180° about a point from each other, and the oblique sides of the two mutually adjoining photosensitive pixels are opposed to and in contact with each other.

Also, there is alternatively provided a solid state imaging device in which first, second and third photosensitive pixels for scanning an optical image signal falling thereon and converting the same photoelectrically are arranged in parallel to one another in a main scan direction to form a set of photosensitive pixel line, and a plurality of such photosensitive pixel lines are arranged in parallel to one another in a main scan direction, characterized in that at least one photosensitive pixel of above-mentioned one set of photosensitive pixel line is formed in a triangle or in a trapezoid, the remaining one or two pixels of the above-mentioned pixel line are respectively formed in a parallelogram, and the oblique sides of the two mutually adjoining pixels of the above-mentioned photosensitive pixel line are opposed to and in contact with each other.

According to another aspect of the invention, there is provided an image read apparatus in which the reflected light of an image illuminated by illuminating means is allowed to fall onto a solid state imaging device as an optical image signal, and the optical image signal is scanned and converted photoelectrically by the solid state imaging device to thereby read the image, characterized in that the present solid state imaging device is structured such that a plurality of photosensitive pixels for scanning and photoelectrically converting an optical image signal falling thereon are arranged in parallel to each other in a main scan direction, the present photosensitive pixels are respectively formed in a triangle or in a trapezoid, the two mutually adjoining ones of the present photosensitive pixels are positioned in point symmetry in which they are rotated in 180° about a point from each other, and the oblique sides of the two mutually adjoining pixels are opposed to and in contact with each other.

Also, according to another aspect of the invention, there is also provided a solid state imaging device in which such that first, second and third photosensitive pixels for scanning an optical image signal falling thereon and converting the same photoelectrically are arranged in parallel to one another in a main scan direction to form a set of photosensitive pixel line, and a plurality of such photosensitive pixel lines are arranged in parallel to one another in a main scan direction, characterized in that at least one photosensitive pixel of one set of photosensitive pixel line is formed in a triangle or in a trapezoid, the remaining one or two pixels of the present pixel line are respectively formed in a parallelogram, and the oblique sides of the two mutually adjoining pixels of the present photosensitive pixel line are opposed to and in contact with each other.

According to still another aspect of the invention, there is provided an image read apparatus comprising: illuminating means for illuminating an image; image forming means for forming the image of an optical image signal of the reflected light of the present image illuminated by the present illuminating means; and a solid state imaging device onto which the optical image signal having passed through the image forming means falls, and also which scans and photoelectrically converts the optical image signal, characterized in that the above-mentioned solid state imaging device is formed in a parallelogram in which a plurality of photosensitive pixels for scanning the optical image signal falling thereon and photoelectrically converting the same are respectively inclined at a given angle, and the present photosensitive pixels are arranged in parallel to each other in a main scan direction, and also characterized in that, between the image and the image forming means or between the image forming means and the solid state imaging device, there is interposed a lowpass filter which has a spatial filtering action in a direction intersecting substantially at right angles to the inclining direction of the above-mentioned photosensitive pixels.

According to yet another aspect of the invention, there is provided an image read apparatus comprising: illuminating means for illuminating an image; image forming means for forming the image of an optical image signal of the reflected light of the image illuminated by the present illuminating means; and a solid state imaging device onto which the optical image signal having passed through the image forming means falls, and also which scans and photoelectrically converts the optical image signal, characterized in that, between the image and the image forming means, there is interposed a diffraction grating with a grating pattern including recessed and projected portions formed alternately, in such a manner that one of the projected portions is situated on the optical axis of the optical path of the optical image signal, the optical path extending from the above-mentioned image to the image forming means.

BRIEF DESCRIPTION OF THE DRAWINGS

FIGS. 4A and 4B show an integration area in connection with the sub-scan direction reading of a photosensitive pixel according to the first embodiment of the invention; in particular, FIG. 4A shows an integration area when a copy image is 100%, while FIG. 4B shows an integration area when a copy image is enlarged by 400%;

FIG. 5 is a graphical representation of the relation between the spatial frequency and MTF in a photosensitive pixel, in which the first embodiment of the invention is compared with a conventional image read apparatus;

FIG. 23A is a front view thereof and FIG. 23B is a side view thereof;

FIG. 28a shows an integration area when a copy image is 100%, while

DETAILED DESCRIPTION OF THE PREFERRED EMBODIMENTS

Now, description will be given below of the embodiments of an image read apparatus and a solid state imaging device according to the invention with reference to the accompanying drawings.

(1) First Embodiment

Figure 1:
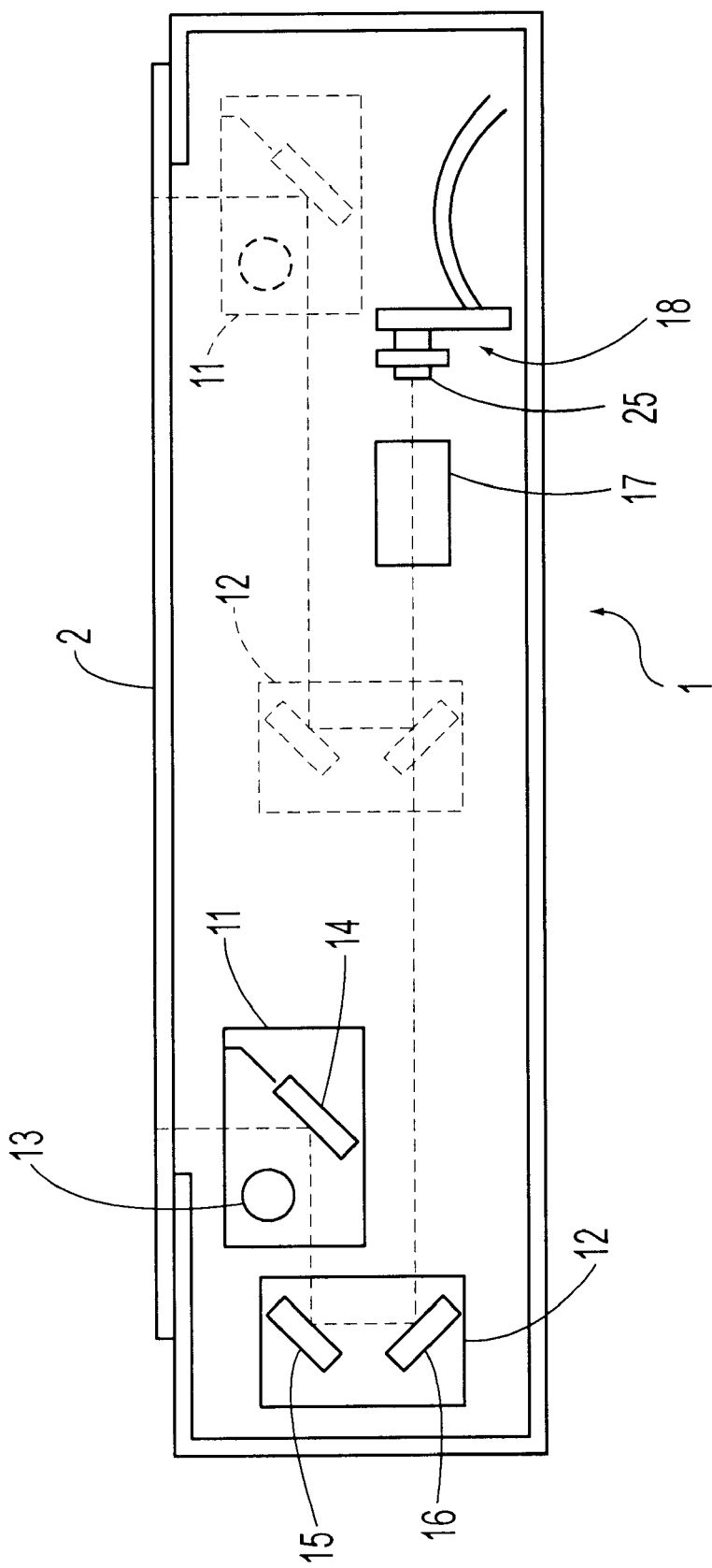
FIG. 1 is a side view of a first embodiment of an image read apparatus according to the invention.

FIG. 1 shows an image read apparatus which is incorporated in a copying machine of a full-color copy type and, in FIG. 1, reference character 1 designates a box-shaped frame. On the frame 1, there is mounted a platen glass 2 in such a manner that it extends horizontally. In actual copying operation, a manuscript (not shown) is put and set on the platen glass 2 in such a manner that the images to be copied of the manuscript face downward. Within the frame 1, there are stored first and second scanners 11 and 12 which are spaced apart from each other in the right and left direction in FIG. 1 and are also free to slide in the right and left direction along guide rails (not shown). In FIG. 1, the first and second scanner 11 and 12 are respectively movable between their wait positions shown by solid lines and their maximum moving positions shown by broken lines. The first scanner 11 includes a lamp (illuminating means) 13 such as a halogen lamp or the like used to illuminate the images of the manuscript placed on the platen glass 2, and a first mirror 14 which is used to receive a reflected light from the manuscript. On the other hand, the second scanner 12 includes a second mirror 15 for receiving the reflected light of the first mirror 14, and a third mirror 16 which receives the reflected light of the second mirror 15. To read the images of the manuscript, while the images are being illuminated by the lamp 12, the first scanner 11 is moved in the right direction in FIG. 1, that is, scans the images and, in linking with the movement of the first scanner 11, the second scanner 12 is moved in the right direction at a speed one-half of the speed of the first scanner 11. When the two scanners 11 and 12 are moved by a distance equivalent to the length of the manuscript, they are made to return to their respective wait positions immediately. Also, within the frame 1, on the right side thereof in FIG. 1, there are disposed a lens (image forming means) 17 and a CCD sensor 18.

As the first scanner 11 scans the images of the manuscript, there is generated a reflected light from an image which is illuminated by the lamp 13. The thus generated reflected light is sequentially refracted and reflected by the first mirror 14 of the first scanner 11 and the second and third mirrors 15 and 16 of the second scanner 12, and is then allowed to pass through the lens 17 due to the optical-axis luminous flux thereof. After then, the reflected light is image formed on the CCD sensor 18 by the lens 17. Responsive to this, the CCD sensor 18, which has not only a function to scan a reflected light but also a function to serve as a light receiving device, scans the reflected light image and carries out photoelectric conversion, and then outputs the thus formed optical signal to an image carrier such as a photoconductor drum (not shown) or the like. The moving speed of the first scanner 11 is coincident with the peripheral speed of the image carrier.

Figure 2:
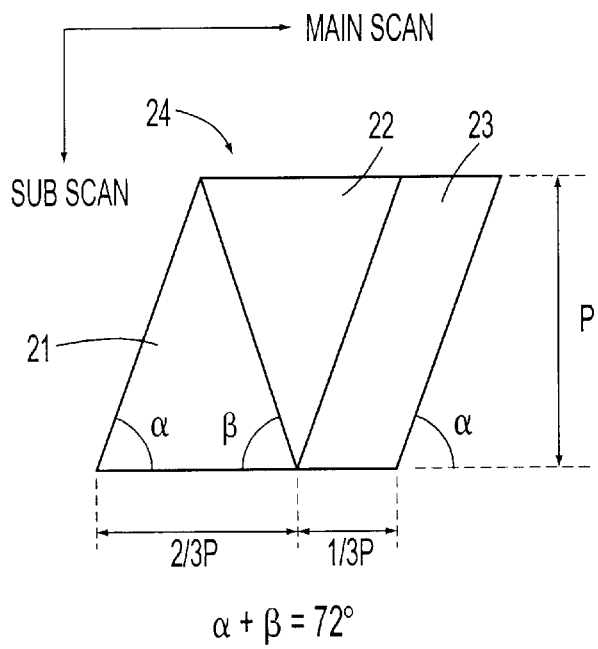
FIG. 2 is a front view of a photosensitive pixel line forming a first embodiment of a solid state imaging device according to the invention.

The CCD sensor 18 includes a solid state imaging device 25 which is composed of a plurality of photosensitive pixel lines 24, each line including a set of first, second and third photosensitive pixels 21, 22 and 23 shown in FIG. 2, while the photosensitive pixel lines 24 are disposed in parallel to each other in a main scan direction (in FIG. 1, in the front and back direction of the figure) intersecting at right angles to the main scan directions of the respective scanners 11 and 12. In a set of photosensitive pixel line 24, the respective photosensitive pixels 21, 22 and 23 are arranged in point order from left to right along the main scan direction. In this case, the first and second photosensitive pixels 21 and 22 are respectively formed as isosceles triangles which are identical in shape and size with each other, while the third sensitive pixel 23 is formed as a parallelogram which is equal in height to the first and second photosensitive pixels 21 and 22. In particular, the first photosensitive pixel 21 is arranged such that the base or bottom side thereof faces downward, on the right side of the first sensitive pixel 21, there is arranged the second sensitive pixel 22 with the bottom side thereof facing upward, and the oblique sides of the mutually adjoining pixels 21 and 22 are opposed to and in contact with each other. The third sensitive pixel 23 is arranged such that the oblique side thereof is opposed to and in contact with the oblique side of the second pixel 22. Also, the vertex of the first photosensitive pixel 21, the bottom side of the second sensitive pixel 22, and the upper side of the third sensitive pixel 23 are present on a straight line along the main scan direction; similarly, the bottom side (or the base) of the first photosensitive pixel 21, the vertex of the second sensitive pixel 22, and the lower side of the third sensitive pixel 23 are present on a straight line along the main scan direction; and, thus the photosensitive pixel line 24 is formed as a parallelogram as a whole.

In the photosensitive pixel line 24, if a pitch is expressed as P, then the bases of the first and second photosensitive pixels 21 and 22 are 2P/3, the base angles $\alpha$ and $\beta\alpha$ thereof are 72°, the base of the third photosensitive pixel 23 is P/3, and the angle $\alpha$ of inclination of the whole pixel line 24 is also 72°. The solid state imaging device 25 is structured in such a manner that a plurality of photosensitive pixel lines 24 are arranged in the main scan direction while the mutually adjoining oblique sides thereof (in this case, the mutually adjoining oblique sides are the oblique side of the first photosensitive pixel 21 of one of the mutually adjoining pixel lines and the oblique side of the third photosensitive pixel 23 of the other) are opposed to and in contact with each other.

Figure 3:
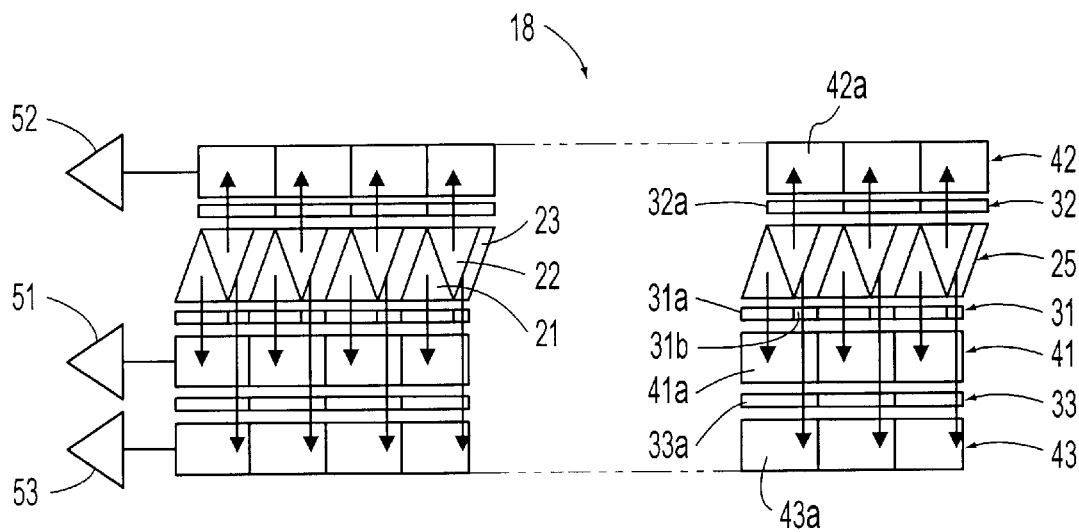
FIG. 3 is a front view of a CCD sensor using a solid state imaging element according to the first embodiment of the invention.

As shown in FIG. 3, on one side (in FIG. 3, on the lower side) of the above-mentioned solid state imaging device 25, there are disposed a first gate line 31 and a first CCD register line 41 which are used to transfer electric charges generated from the first photosensitive pixels 21. The first gate line 31 includes a plurality of alternately arranged gates 31a and gates 31b for vertical transfer, while the first CCD register line 41 includes a plurality of CCD registers 41a for horizontal transfer. Also, on the other side (in FIG. 3, on the upper side) of the solid state imaging device 25, in correspondence to the second photosensitive pixels, there are disposed a second gate line 32 including a plurality of gates 32a and a second CCD register line 32 including a plurality of CCD registers 42a. Further, on the outside (in FIG. 3, on the lower side) of the first CCD line 41, in correspondence to the third photosensitive pixels 23, there are disposed a third gate line 33 including a plurality of gates 33a and a third CCD registers 43a including a plurality of CCD registers 43a. To the CCD register lines 41, 42 and 43, there are respectively connected amplifiers 51, 52, and 53 which are used to amplify electric charges generated from the respective photosensitive pixels 21, 22, and 23.

Now, the images of the manuscript are read by the CCD sensor 18 in the following manner. That is, when the images of the manuscript are illuminated by the lamp 13 of the image read apparatus, the resultant reflected light is allowed to pass through the lens 17 and is incident on the first, second and third photosensitive pixels 21, 22 and 23 of the solid state imaging device 18. Next, after electric charges corresponding to a horizontal line in the main scan direction are integrated, the gates 32a of the second gate line 32 and the gates 31b of the first gate line 31 are opened, and the electric charges of the second photosensitive pixels 22 are thereby allowed to pass the gates 32a and are transferred to the CCD registers 42a of the second CCD register line 42, while the electric charges of the third photosensitive pixels 23 are thereby allowed to pass the gates 31b and are transferred to the CCD registers 41a of the first CCD register line 41. Then, the gates 33a of the third gate line 33 are opened, and the electric charges of the third photosensitive pixels 23 are thereby allowed to pass through the gates 33a and are transferred to the CCD registers 43a of the third CCD register line 43. Next, the gates 31a of the first gate line 31 are opened, and the electric charges of the first photosensitive pixels 21 are transferred to the CCD registers 41a of the first CCD register line 41. After then, clock pulses are applied to the CCD registers 41a, 42a and 43a of the CCD register lines 41, 42, and 43. As a result of this, the electric charges of the respective photosensitive pixels 21, 22 and 23 are output in the parallel arrangement order through the respective amplifiers 51, 52, and 53.

Figure 28A:
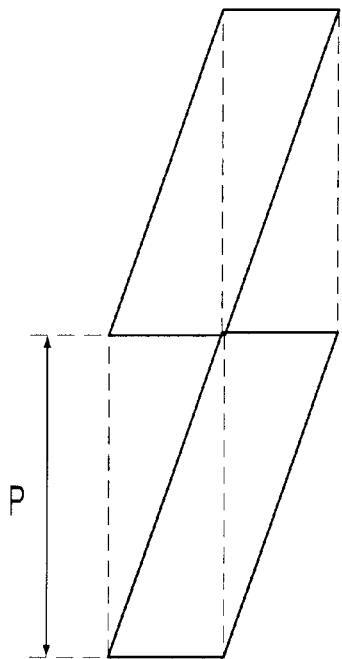
FIGS. 28A show an integration area in connection with the sub-scan direction reading of a photosensitive pixel according to a conventional image read apparatus; in particular.
Figure 28B:
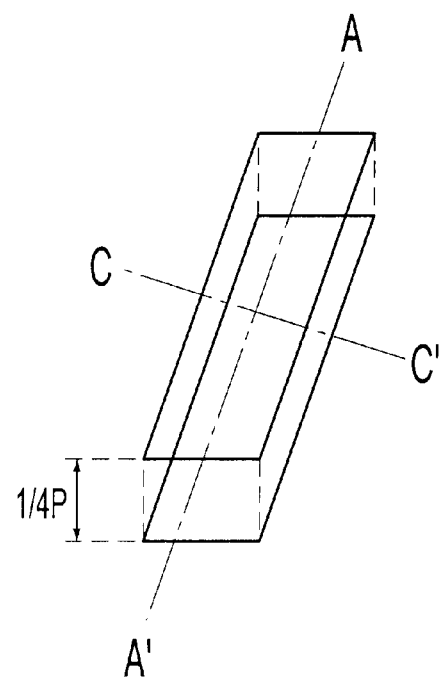
FIG. 28b shows an integration area when a copy image is enlarged by 400%.

On the other hand, image reading in the sub-scan direction due to the image scanning operation by the respective scanners 11 and 12 is taken in a direction going downward from above in FIG. 2, that is, intersecting at right angles to the main scan direction, and the integration value of the reading is output as the image data. Here, FIGS. 4a and 4b show an integration area in the sub-scan direction with the first photosensitive pixel 21 selected as the representative of the photosensitive pixels. In particular, FIG. 4A shows an integration area when a copy image is 100%, while FIG. 4B shows an integration area when a copy image is enlarged by 400%. Since the scan distances of the respective scanners 11 and 12 in enlargement are decreased in inverse proportion to an enlargement magnification, the scan distances in the sub-scan direction are also decreased when compared with the 100% copy image. In this case, because the center of the integration of the first photosensitive pixel 21 is shifted nearer to the base thereof, an angle at which the MTF thereof becomes highest, as shown in FIG. 4B, provides the angle B–B' which intersects at right angles to the A–A' direction and is situated nearer to the base of the sensitive pixel 21. When the pixel width of B–B' is compared with the pixel width of C–C' at which the MTF of the conventional parallelogram-shaped photosensitive pixel shown in FIGS. 28 and 28b become highest, the pixel width of B–B' is wider and, therefore, the virtual MTF thereof attenuates.

When this is examined from the viewpoint of the characteristic of the MTF with respect to the manuscript frequency, as shown in FIG. 5, at the angle A–A' where the MTF is lowest, in both of the conventional pixel and the present embodiment, the MTFs thereof fall down at the Nyquist frequency 1/Pm (frequencies/mm). On the other hand, from the viewpoint of the direction where the MTF is highest, in the conventional type C–C' direction, because the pixel width thereof is narrow, the MTF thereof is still high even when it goes beyond the Nyquist frequency and this tendency becomes clearer as the enlargement magnification increases. In contrast, in the present embodiment, since the pixel width of B–B' has a length approximate to the width of the base 2P/3, the MTF thereof attenuates to thereby approach the characteristic of the angle A–A'. That is, the MTF of the present embodiment is prevented from being too high in a specific direction. As a result of this, it is possible to prevent the deteriorations of the quality of the image formed, such as a moire, folding distortion, coloring, a blur and the like, so that a copy image of high quality can be obtained. Also, since the photoelectric conversion of the respective photosensitive pixels 21, 22 and 23, that is, the output of the electric charges thereof is carried out in the order of the arrangement thereof, the present image read apparatus can be simplified in structure as well as can be manufactured at a low cost.

The above-mentioned photosensitive pixels 21, 22 and 23 are assumed that, for example, they respectively have color filters corresponding to the three primary colors of the light as will be described below. That is, the first photosensitive pixel 21 is assumed to read red (R), the second photosensitive pixel 22 is assumed to read green (G), and the third photosensitive pixel 23 is assumed to read blue (B), while these three photosensitive pixels form a set of photosensitive pixel line 24 for RGB. Here, since the third photosensitive pixel 23 is formed in a parallelogram, it cannot provide such MTF attenuation effect as described above. However, the third photosensitive pixel 23 may be used as a pixel for blue as described above. The complementary color of blue is yellow and, therefore, by reading blue, yellow can be read in the long run. Since yellow is hard to be recognized by human eyes, yellow does not cause great image quality deterioration. In other words, as in the present embodiment, when the photosensitive pixels are used in the form of a combination of two isosceles triangles and a parallelogram, the photosensitive pixel of the parallelogram may be used as a pixel for blue.

[Modifications of First Embodiment]

Next, description will be given below of the modifications 1 to 4 of the solid state imaging device 18 according to the first embodiment of the invention.

Figure 6:
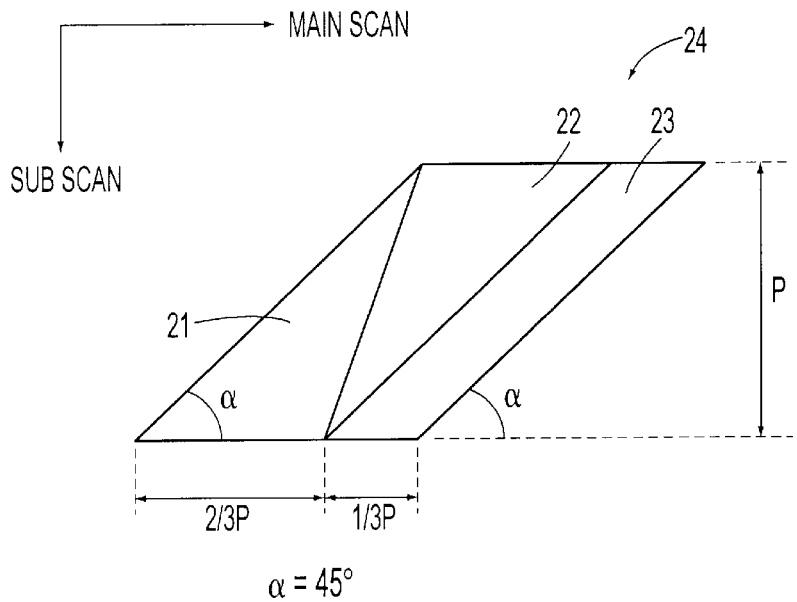
FIG. 6 is a front view of a modification 1 of a photosensitive pixel line according to the first embodiment of the invention.

(Modification 1 (FIG. 6))

In the present modification, the first and second photosensitive pixels 21 and 22 are respectively formed as triangles and the third photosensitive pixel 23 is formed as a parallelogram, while the arrangement order thereof is similar to the above-mentioned first-embodiment. However, the base angles α of the first and second photosensitive pixels 21 and 22 as well as the inclination angle α of the whole photosensitive pixel line are 45° which is smaller than 72° in the first embodiment. The length of the base of the first and second photosensitive pixels 21 and 22 and the length of the base of the third photosensitive pixel 23 with respect to the pitch P are respectively 2P/3 and P/3.

Figure 7:
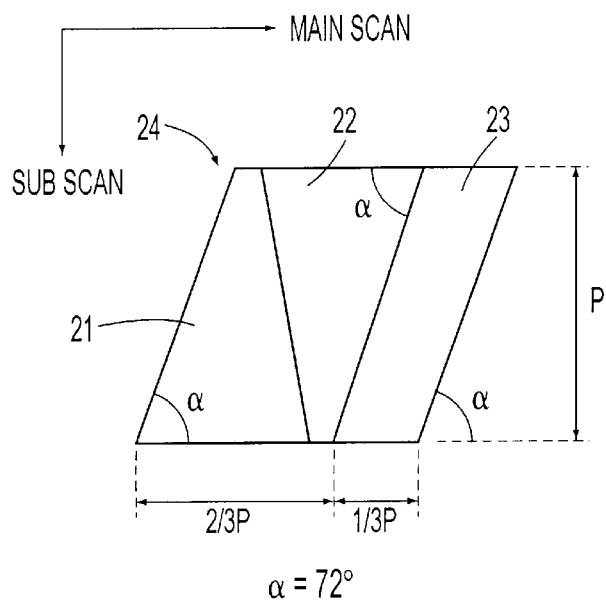
FIG. 7 is a front view of a modification 2 of a photosensitive pixel line according to the first embodiment of the invention.

(Modification 2 (FIG. 7))

In the present modification 2, the photosensitive pixels 21 and 22 thereof corresponding to the first and second photosensitive pixels 21 and 22 of the above-mentioned first embodiment are respectively formed in a trapezoid which is approximate to an isosceles triangle. The present photosensitive pixels 21 and 22 are identical in shape and size with each other, while one of the base angles α, when measured from the longer upper or lower base, as well as the inclination angle α of the whole photosensitive pixel line are both 72°. Also, the total of the lengths of the upper and lower bases with respect to the pitch P is 2P/3, while the length of the base of the third photosensitive pixel is P/3.

The above-mentioned modifications 1 and 2 can respectively provide a similar operation effect to the previously described first embodiment. That is, in the first embodiment, any form can be employed, provided that the photosensitive pixel line 24 is composed of a combination or set of two triangles or two trapezoids identical in shape and size and a parallelogram corresponding to the triangles or trapezoids.

(Modification 3 (FIGS. 8 and 9))

Figure 8:
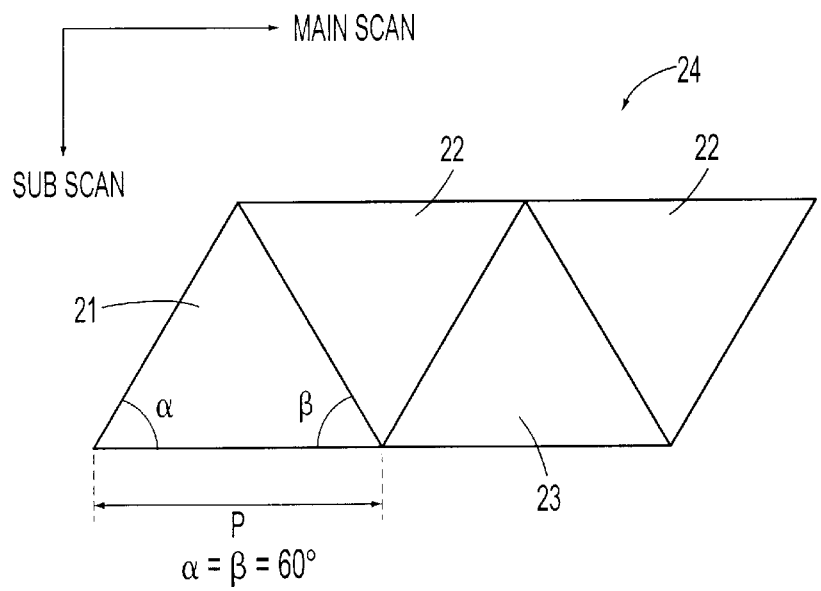
FIG. 8 is a front view of a modification 3 of a photosensitive pixel line according to the first embodiment of the invention.
Figure 9:
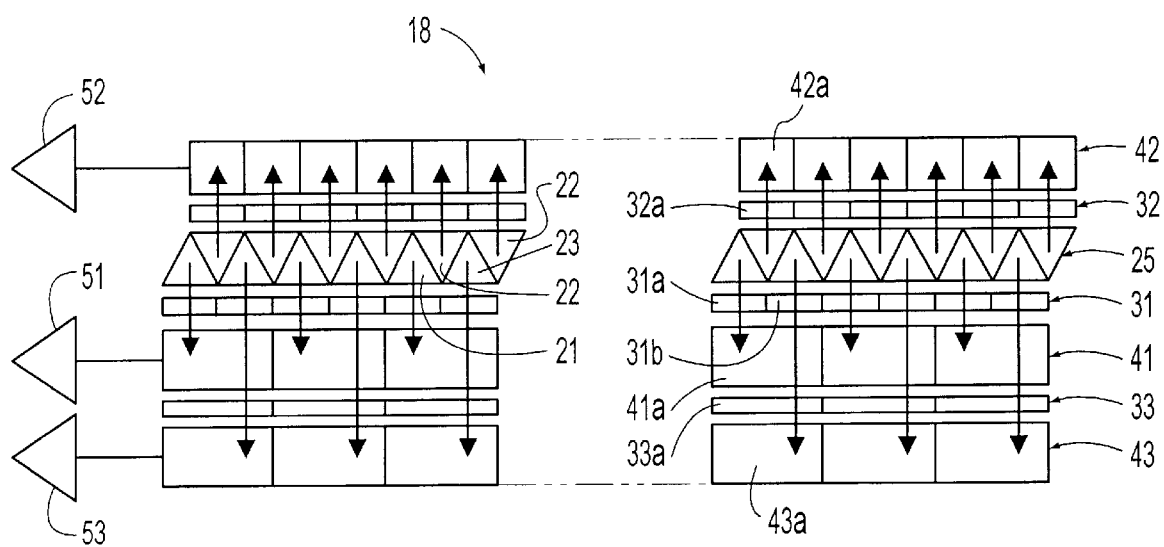
FIG. 9 is a front view of a CCD sensor using a photosensitive pixel line according to the modification 3 of the first embodiment.

In the modification 3, as shown in FIG. 8, a set of photosensitive pixel line 24 is composed of a combination of four isosceles triangles which are identical in shape and size with one another. In this case, when viewed from the left side of FIG. 8, the first, second, third and second photosensitive pixels 21, 22, 23, and 22 are arranged such that the oblique sides thereof are opposed to and in contact with each other in this order and the whole photosensitive pixel line 24 is formed in a parallelogram. The base angles α and β of the respective photosensitive pixels 21, 22 and 23 as well as the inclination angle α of the whole photosensitive pixel line 24 are respectively 60°, while the bases of the pixels are respectively set for P which is equal to the pitch P. Now, FIG. 9 shows an embodiment of photoelectric conversion to be carried out by the respective photosensitive pixels 21, 22 and 23, while the operation thereof is similar to the operation shown in FIG. 3. In the present photosensitive pixel line 24, the resolution of the second photosensitive pixel 22 is double those of the remaining photosensitive pixels. For example, where the pitch P is 0.01 mm and the optical magnification m is 4.23, the resolutions of the first and third photosensitive pixels 21 and 23 are 300 dpi and the resolution of the second photosensitive pixel 22 is 300 dpi. In the present photosensitive pixel line 24, it is effective that the second photosensitive pixel 22 is used to read green which is the color that provides the highest visibility for human eyes.

(Modification 4 (FIGS. 10 to 12))

Figure 10:
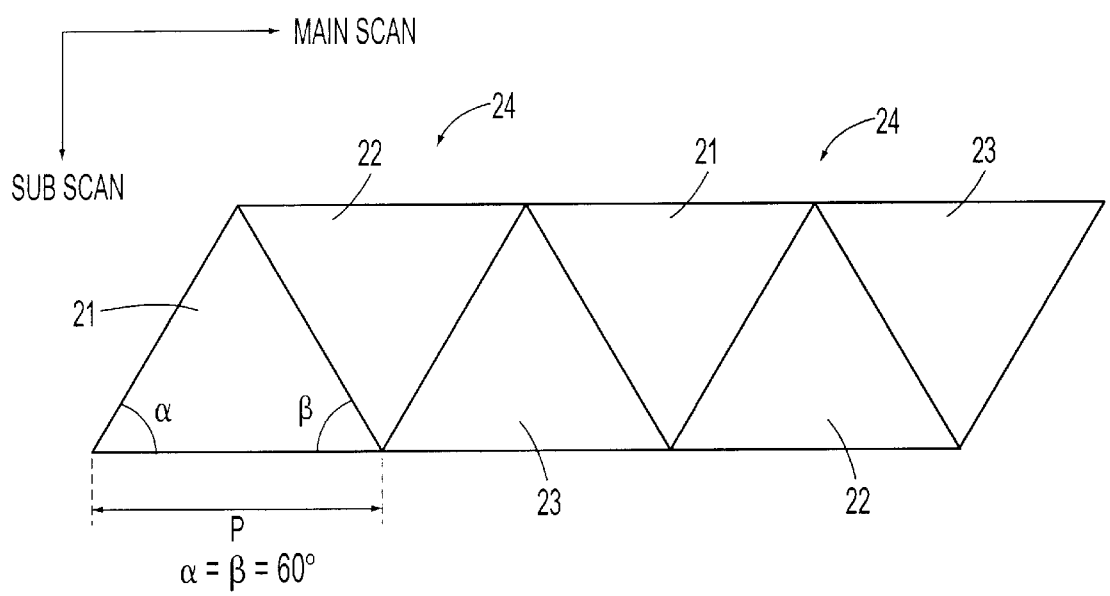
FIG. 10 is a front view of a modification 4 of a photosensitive pixel line according to the first embodiment of the invention.

Now, FIG. 10 shows a modification 4 according to the first embodiment of the invention. In the present embodiment, a set of photosensitive pixel line 24 is composed of a combination of three photosensitive pixels which are formed of three isosceles triangles identical in shape and size with one another. In this case, when viewed from the left side of the FIG. 10, the first, second and third photosensitive pixels thereof 21, 22 and 23 are arranged such that the oblique sides thereof are opposed to and in contact with each other in this order, while the whole photosensitive pixel line 24 provides a trapezoid. The base angles α and β of the respective photosensitive pixels 21, 22 and 23 as well as the inclination angle α of the whole photosensitive pixel line 24 are respectively 60°, while the bases of the pixels are respectively set for P which is equal to the pitch P.

Figure 11:
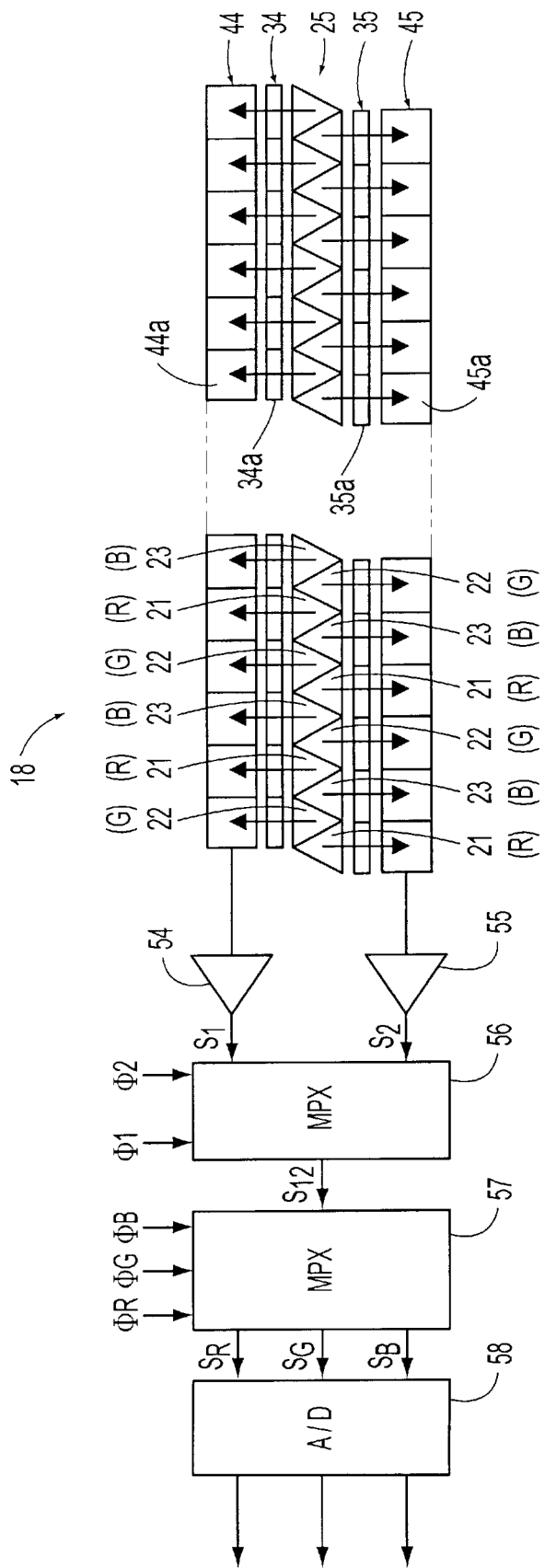
FIG. 11 is a block diagram of a CCD sensor using a photosensitive pixel line according to the modification 4 of the first embodiment, and a re-arranging circuit connected with the CCD sensor.
Figure 12:
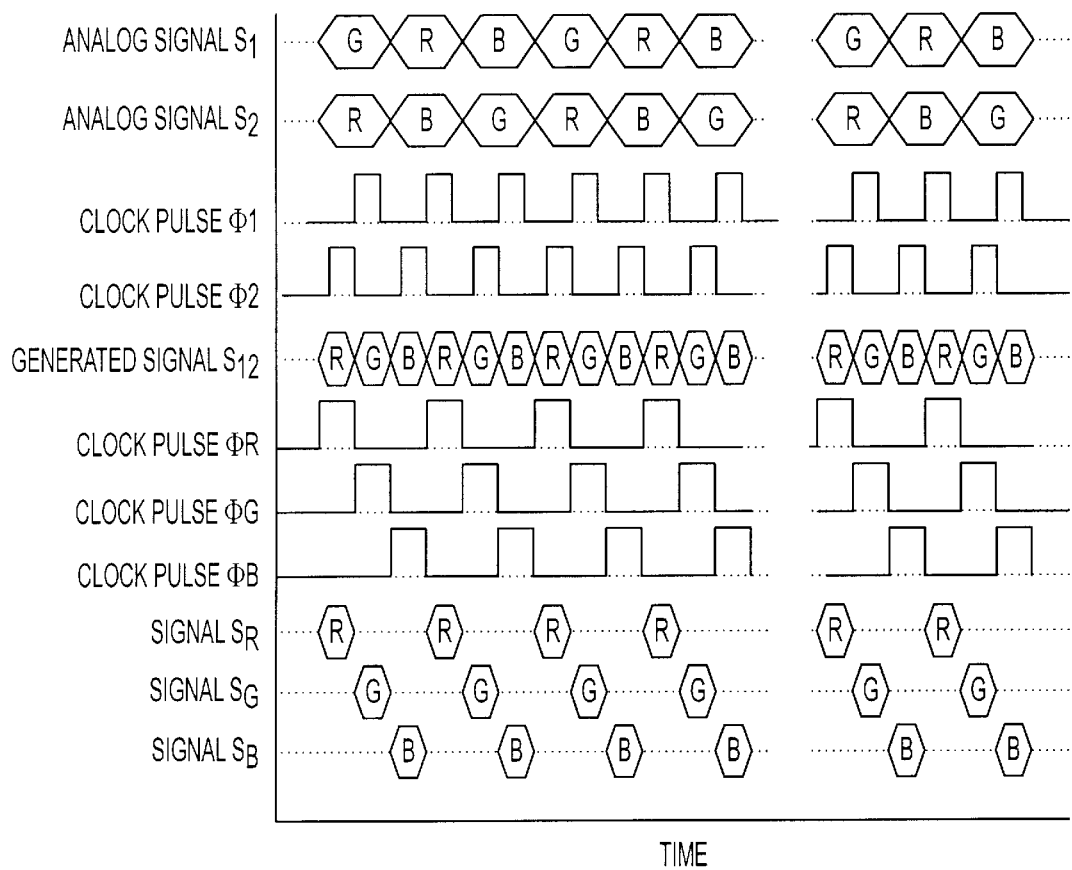
FIG. 12 a time chart of output signals output from the CCD sensor using the modification 4 of the first embodiment, and the input pulses and output signals of the re-arranging circuit.

Also, the third photosensitive pixel 23 is in contact with the first photosensitive pixel 21 of another set of photosensitive pixel line 24. In the two adjoining sets of photosensitive pixel lines 24, the first photosensitive pixels 21 thereof are turned upside down with respect to each other. In this manner, there is provided a solid state imaging device 25 in which, as shown in FIG. 11, when viewed from the left side thereof, the photosensitive pixels are arranged in the order of 21, 22, 23, 21, 22, 23, - - - . Therefore, the present modification seemingly resembles the modification 3 but it is different from the modification 3 in the arrangement order of the photosensitive pixels included in the interior thereof.

In the thus arranged solid state imaging device 25, if it is assumed that the photosensitive pixels situated in the upper side of the FIG. 11 form a first line and the photosensitive pixels situated in the upper side thereof form a second line, then the photosensitive pixels are arranged in the order of 22, 21, 23, 22, 21, 23, - - - from left in the first line, while they are arranged in the order of 21, 23, 22, 21, 23, 22, - - - from left in the second line. Similarly to the previous modifications, the first photosensitive pixel 21 reads red (R), the second photosensitive pixel 22 reads green (G), and the third photosensitive pixel 23 reads blue (B), respectively.

In the present modification, there are provided a first gate line 34 and a first CCD register line 44 which are used to transfer electric charges generated in the photosensitive pixels 22, 21, 23, 22, 21, 23, - - - of a first line shown in FIG. 11. The first gate line 34 is structured in such a manner that a plurality of gates 34a having the same structure are arranged in series, while the first CCD register line 44 is composed of a plurality of CCD registers 44a for horizontal transfer. Also, there are further provided a second gate line 35 and a second CCD register line 45 which are used to transfer electric charges generated in a second line of photosensitive pixels 21, 23, 22, 21, 23, 22, - - - . Similarly to the above, the second gate line 35 is structured such that a plurality of gates 35a having the same structure are arranged in series, while the second CCD register line 45 is composed of a plurality of CCD registers 45a for horizontal transfer.

To the first CCD register line 44, there is connected an amplifier 54 which is used to amplify electric charges generated in the first line of photosensitive pixels 22, 21, 23, - - - and, to the second CCD register line 45, there is connected an amplifier 55 which is used to amplify electric charges generated in the second line of photosensitive pixels 21, 23, 22, - - - . As described above, since the third photosensitive pixel 23 outputs an optical image of B, there are transferred from the first CCD register line 44 analog outputs in the order of G R B G R B, - - - , while there are transferred from the second CCD register line 45 analog outputs in the order of R G B R G B, - - - . The amplifiers 54 and 55 amplify these analog outputs and output them as analog signals $S_1$ and $S_2$ (See FIG. 12).

The analog signals $S_1$ and $S_2$ are input into a first multiplexer 56. To the multiplexer 56, there can be supplied two kinds of clock pulses ϕ11 and ϕ2 which are about half out of phase with each other and have the same cycle. When the clock pulse ϕ1 is supplied thereto, the multiplexer 56 samples the analog signals $S_1$, and when the clock pulse ϕ2 is supplied, the multiplexer samples the analog signals $S_2$. In this manner, the multiplexer 56 generates analog signals $S_{12}$ which are the serial outputs of R G B R G B - - - (see FIG. 12).

The analog signal $S_{12}$ are input into a second multiplexer 57. Here, to the multiplexer 57, there can be supplied clock pulses ϕR, ϕG, and ϕB which are one third out of phase with one another and have the same cycle. When the clock pulses ϕR is supplied, the multiplexer 57 samples the analog signals $S_{12}$ and then outputs analog signals $S_R$ which are the results of the sampling thereof. Similarly, the multiplexer 57 outputs analog signals $S_G$ as the results of the sampling thereof when the clock pulses ϕG are supplied, and outputs analog signals $S_B$ as the results of the sampling thereof when the clock pulses ϕB are supplied. In this manner, there can be generated the parallel time series analog signals $S_R$, $S_G$ and $S_B$ which respectively correspond to the respective colors R, G and B (see FIG. 12). These analog signals $S_R$, $S_G$ and $S_B$ are then converted individually to digital signals by an analog/digital converter 58.

As described above, in the present modification, since the electric charges corresponding to the readings of the respective colors are stored in the respective CCD registers 44a and 45a of the CCD register lines 44 and 45 for horizontal transfer, in the respective CCD register lines 44 and 45, there are mixedly present the electric charges that correspond to the readings of the three respective colors R, G and B. However, the analog signal, in which the electric charges respectively corresponding to the three colors are mixedly present, can be separated into signals for the respective colors by a re-arranging circuit provided downstream thereof, especially, by the multiplexers 56 and 57. Due to this, the CCD register lines 44, 45 and gates 34, 35 can be standardized.

(2) Second Embodiment

Next, description will be given below of a second embodiment of an image read apparatus according to the invention.

Figure 13:
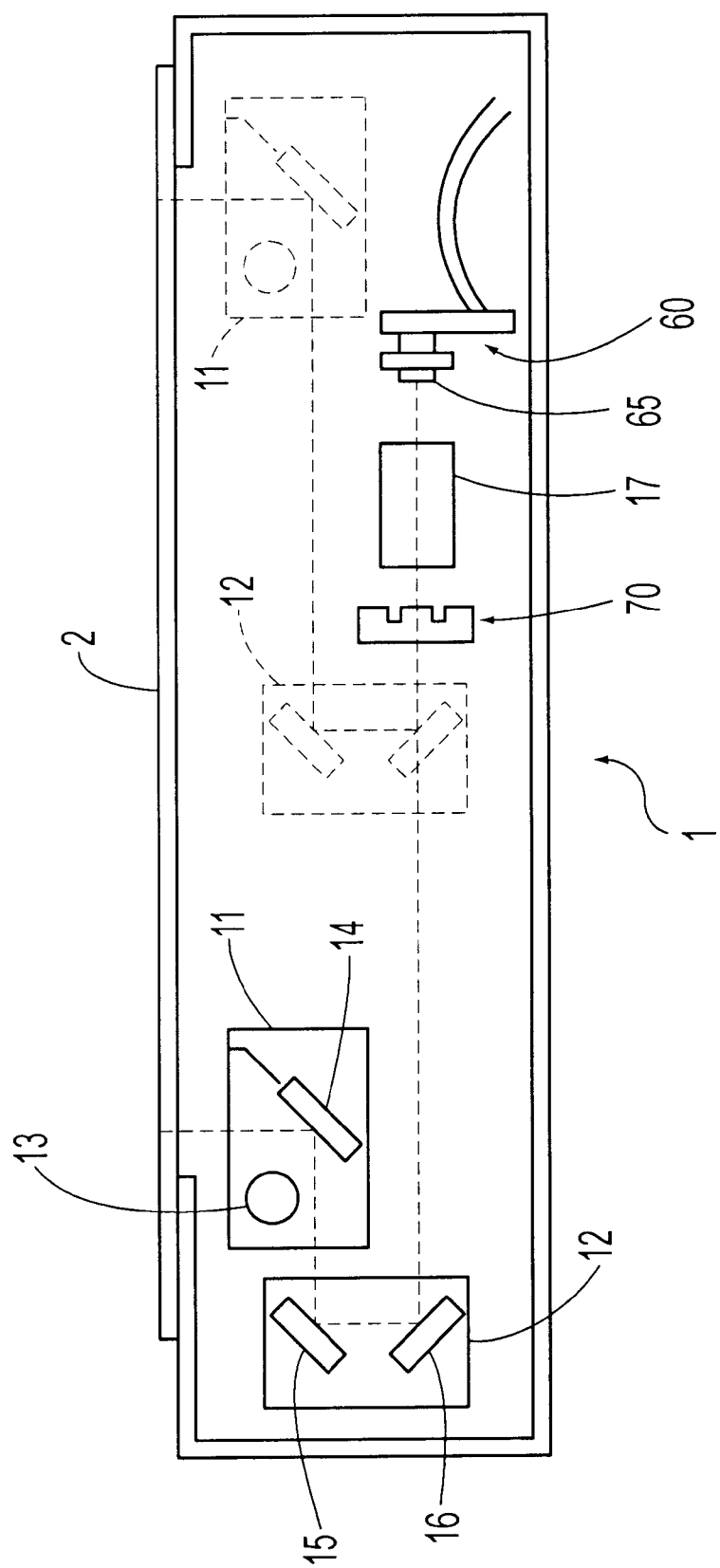
FIG. 13 is a side view of a second embodiment of an image read apparatus according to the invention.
Figure 14:
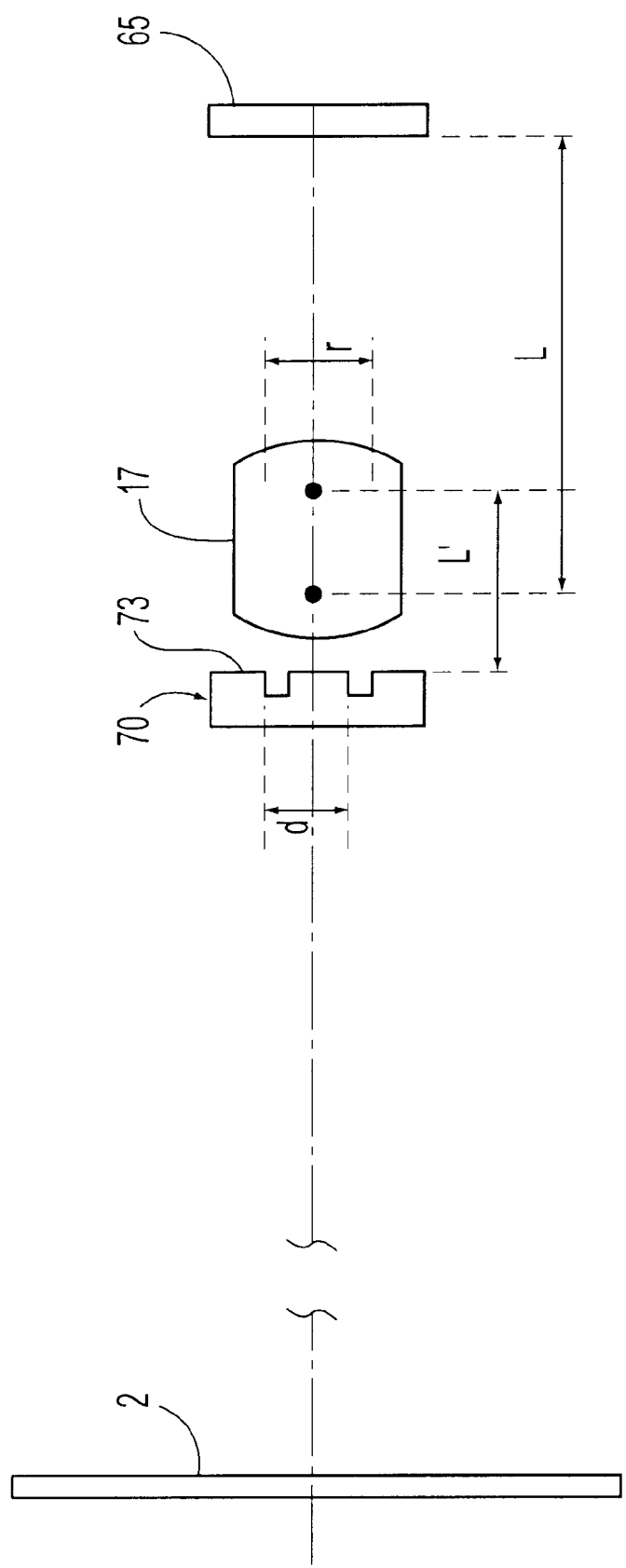
FIG. 14 is a side view of the main portions of the second embodiment of the invention.
Figure 15:
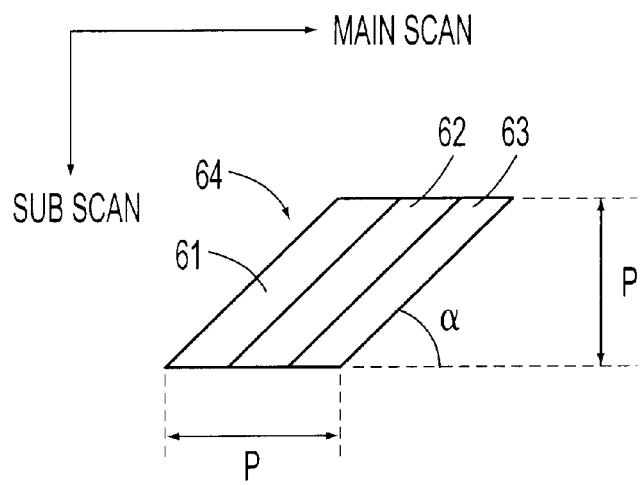
FIG. 15 is a front view of a photosensitive pixel line forming a solid state imaging element used in the second embodiment.
Figure 16:
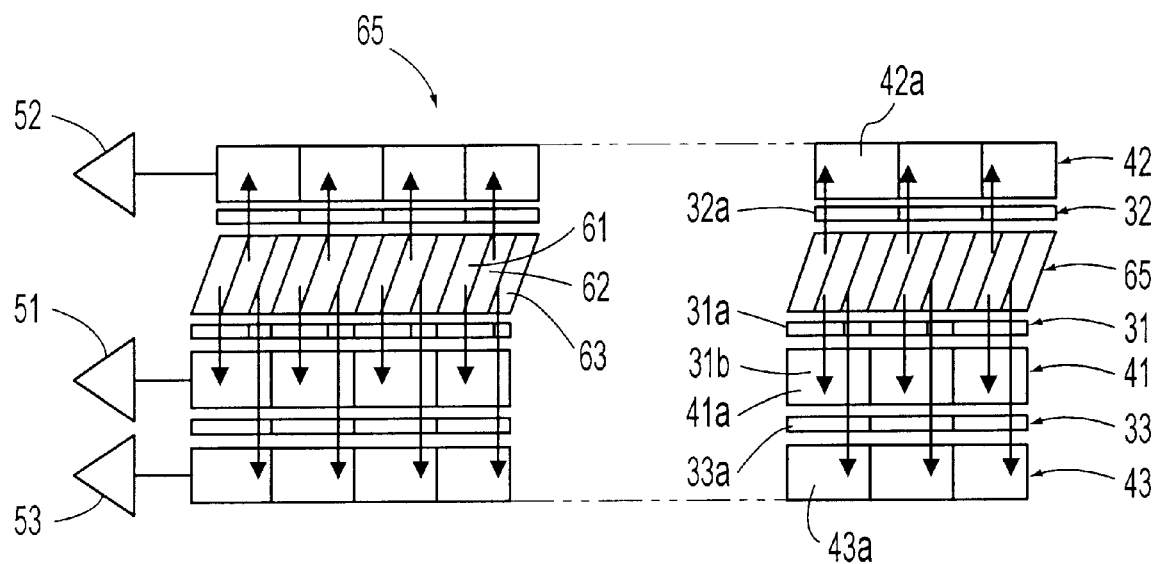
FIG. 16 is a front view of a CCD sensor using the above photosensitive pixel line.
Figure 17:
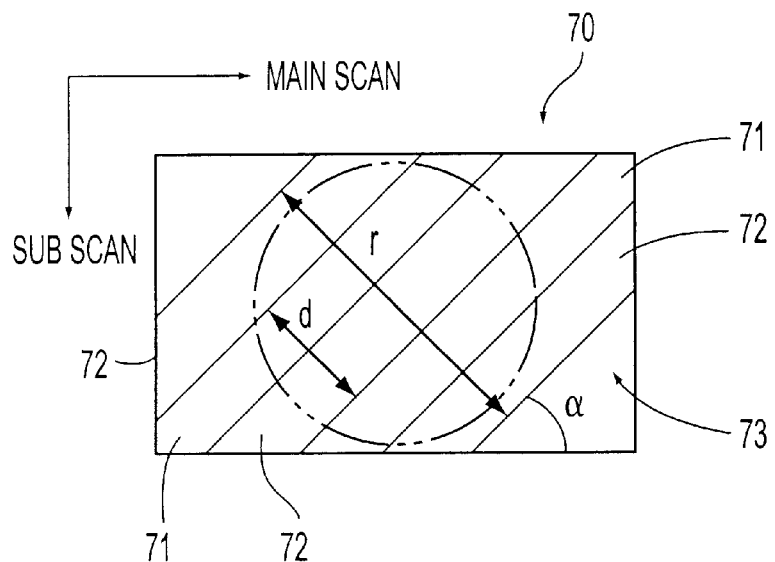
FIG. 17 a front view of a diffraction grating used in the second embodiment.

In FIG. 13, there is shown an image read apparatus which is almost similar to the previously described first embodiment, while the same components thereof are given the same designations and thus the description thereof is omitted here. The structure of a CCD sensor 60 of the present image read apparatus is as follows:

The present CCD sensor 60 includes a solid state imaging device 65. In the solid state imaging device 65, as shown in FIG. 15, first, second and third photosensitive pixels 61, 62 and 63, which are respectively formed in parallelograms having the same shape and size, are arranged parallel in point order in the main scan direction to form a set of photosensitive pixel line 64, and a plurality of such photosensitive pixel lines 64 are arranged in parallel to each other in the main scan direction. The inclination angle α of the photosensitive pixel line 64 with respect to the main scan direction can be set arbitrarily and the base of the photosensitive pixel line 64 is set for P which is equal to the pitch P thereof. In this case, the first photosensitive pixel 61 corresponds to red (R), the second photosensitive pixel 62 corresponds to green (G), and the third photosensitive pixel 63 corresponds to blue (B); and, a set of photosensitive pixel line 64 provides a pixel line for RGB. Now, FIG. 16 shows how the photoelectric conversion of the respective photosensitive pixels 61, 62 and 63 is executed and, in this case, the operation of the photoelectric conversion is carried out similarly to the operation shown in FIG. 3. And, in the present embodiment, as shown in FIG. 14 as well, a primary diffraction grating (lowpass filter) 70 is interposed between a platen glass 2 (that is, a manuscript) and a lens 17 as well as adjacently to the lens 17. The structure of the present diffraction grating 70 is as follows:

That is, as shown in FIGS. 14 and 17, the diffraction grating 70 includes, on the side thereof facing the lens 17, a parallel grating pattern 73 in which recessed portions 71 and projected portions 72 are formed alternately. And, the grating pattern 73 is arranged not only at the same angle as the inclination angle α of the photosensitive pixels 61, 62 and 63 with respect to the main scan direction but also in parallel to the inclination of the photosensitive pixels 61, 62 and 63. The arrangement position of the diffraction grating 70 is decided in the following manner.

With reference to FIGS. 14 and 17, if the pitch (the width of a set of recessed portion 71 and projected portion 72) of the grating pattern 73 is expressed as d (mm), the optical magnification of the lens as m, the distance between the diffraction grating 70 and solid state imaging device 65 as TL (mm), (however, when the diffraction grating 70 is disposed on the manuscript side of the lens 17, TL=L–L'/m), the cutoff frequency as $f_c$ (1p/mm), a difference between a grating material refractive index and an air refractive index as n, and the wavelength as λ (mm), then the diffraction grating is disposed at a position which satisfies the following equation:

$$d = 8 \times f_c \times m \times n \times \lambda \times TL$$

Here, the pitch d of the grid pattern 73 is preferably one half or less than the pupil diameter r of the lens 17 from the viewpoint of the performance of the grating pattern 73. Also, it is suitable that the cutoff frequency $f_c$ is set in the neighborhood of 1/Pm (frequencies/mm) shown in FIG. 18. Therefore, for example, where the resolution is 400 dpi (about 15.7 frequencies/mm), the optical magnification m is equal to 4.5, the grating material refractive index n is 1.5, the wavelength λ is 550 mm, the pupil diameter r of the lens 17 is 20 mm, and the upper limit value of r=½ d is selected to thereby set d equal to 10 mm, then the resultant TL is about 64.3 mm. The position of the diffraction grating 70 can be decided in this manner. However, the further the diffraction grating 70 is apart from the lens 17, the further the optical area is widened and thus the area of the diffraction grating 70 itself must be increased, which results in the increased cost. Therefore, it is preferred that the diffraction grating 70 is disposed as near as possible to the lens 17. Also, preferably, the angle of the grating pattern 73 may be set substantially in the range of ±5° with respect to the inclination angle α of the photosensitive pixels 61, 62 and 63.

The diffraction grating 70 generates a plural degree (0, 1, 2, - - - n degree) of diffracted rays with respect to an incident light in a direction intersecting at right angles to the grating pattern 73. This means that an image is formed double or more times and, therefore, the diffraction grating 70 naturally plays the role of an optical lowpass filter which attenuates the MTF. Since the diffraction grating 70 does not cause the other light components than the light components in the above-mentioned orthogonal direction to generate any diffraction rays, if the angle of the grating pattern 73 is adjusted properly, then the MTF can be attenuated in an arbitrary direction. In the present embodiment, in order to attenuate the MTF of the integration area in the C–C' direction shown in and discussed with reference to FIG. 28, the angle of the grating pattern 73 in the extending direction thereof is made to coincide with the inclination angle a of the photosensitive pixels 61, 62 and 63.

Figure 18:
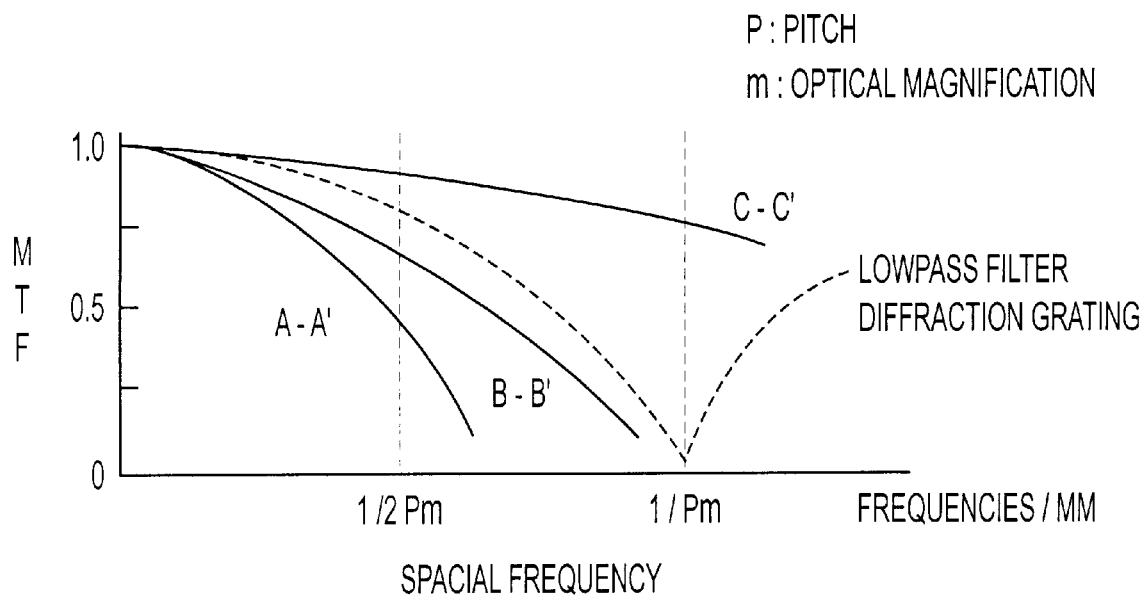
FIG. 18 is a graphical representation of the relation between the spatial frequency and MTF of a photosensitive pixel, in which the second embodiment of the invention is compared with the conventional image read apparatus.

When this is examined from the viewpoint of the MTF characteristic with respect to the manuscript frequency, as shown in FIG. 18, in the angle A–A' (see FIG. 28) where the MTF is lowest, in both of the conventional example and the present embodiment, the MTFs thereof fall down at the Nyquist frequency 1/Pm (frequencies/mm). On the other hand, as for the direction where the MTF increases, in the conventional example, since the pixel width in the C–C' direction thereof is narrow, the MTF is still high even when it goes beyond the Nyquist frequency and this tendency becomes more outstanding as the enlargement magnification increases. In contrast, in the present embodiment, the MTF can be attenuated by the diffraction grating 70 down to an MTF curve shown by the curve B–B', so that the MTF can be made to approach the characteristic of the angle A–A'. That is, while using the photosensitive pixels of a parallelogram type in which a moire is prevented only in the main scan 0° direction, the deterioration of the image quality can be prevented with respect to all manuscript angles, thereby being able to provide a copy image of high quality.

Here, in the present embodiment, as an optical lowpass filter, there is used the diffraction grating 70 but this is not limitative. Besides the diffraction grating 70, if an optical member having a spatial filtering action is disposed in a direction intersecting substantially at right angles to the inclining direction of the photosensitive pixels 61, 62 and 63, a similar effect can be provided. As the optical member, for example, there is available a double refraction plate such as a crystal plate which can be formed by combining together a plurality of members having different direction properties.

[Modification of Second Embodiment]

Figure 19:
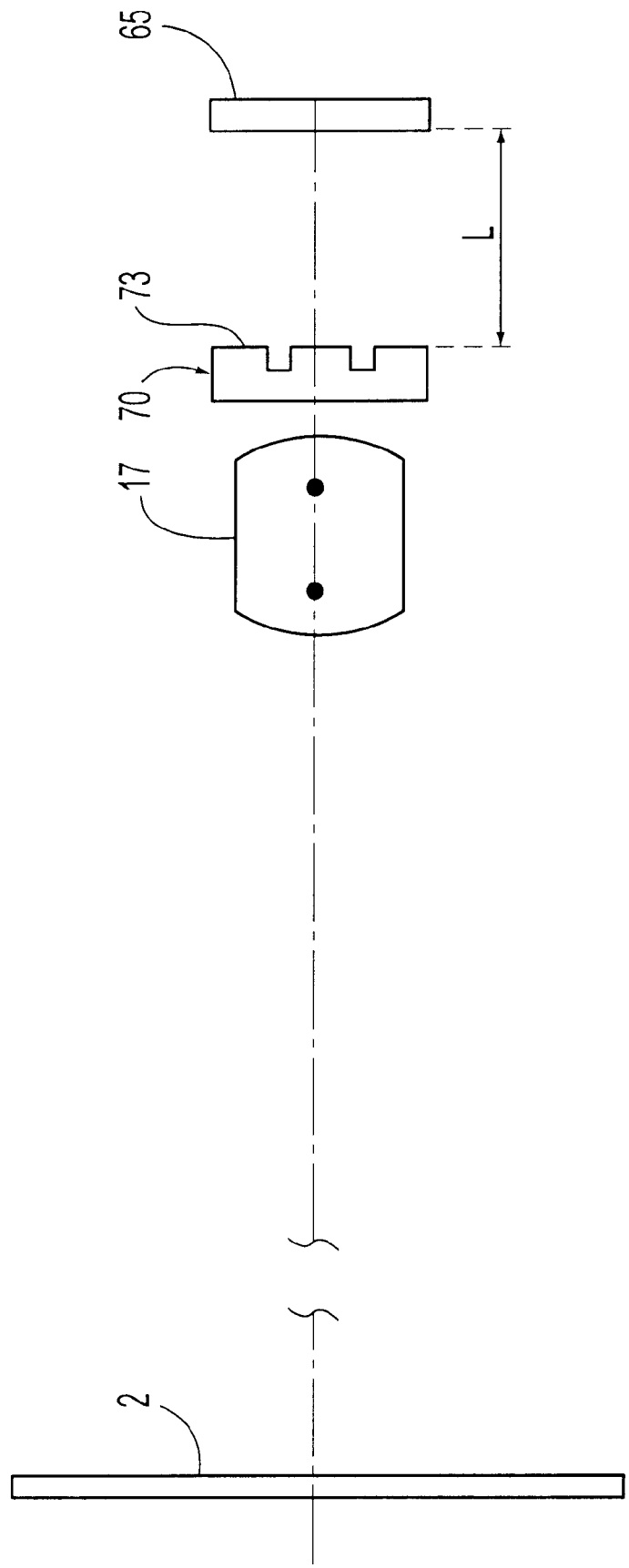
FIG. 19 is a side view of a modification of the second embodiment of the invention.

Now, in FIG. 19, there is shown a modification of the above-mentioned second embodiment according to the invention. In the present modification, the diffraction grating 70 is disposed on the solid state imaging device 65 side of the lens 17. In the present diffraction grating 70, the grating pattern 73 thereof is directed toward the solid state imaging device 65 side and, similarly to the second embodiment, the grating pattern 73 is set at the same angle as the inclination angle a of the photosensitive pixels 61, 62 and 63 with respect to the main scan direction as well as is so arranged to be parallel to the inclination of the photosensitive pixels 61, 62 and 63. In this case, the above-mentioned TL is equal to L. By disposing the diffraction grating 70 in front of the lens 17 in this manner, the precision of the diffraction grating 70 and the mounting precision thereof can be set relatively rough and a space for the diffraction grating 70 can be saved, which makes it possible to reduce the cost of the image read apparatus as well as to improve the efficiency of the assembling operation thereof.

(3) Third Embodiment

Next, description will be given below of a third embodiment of an image read apparatus according to the invention.

Figure 20:
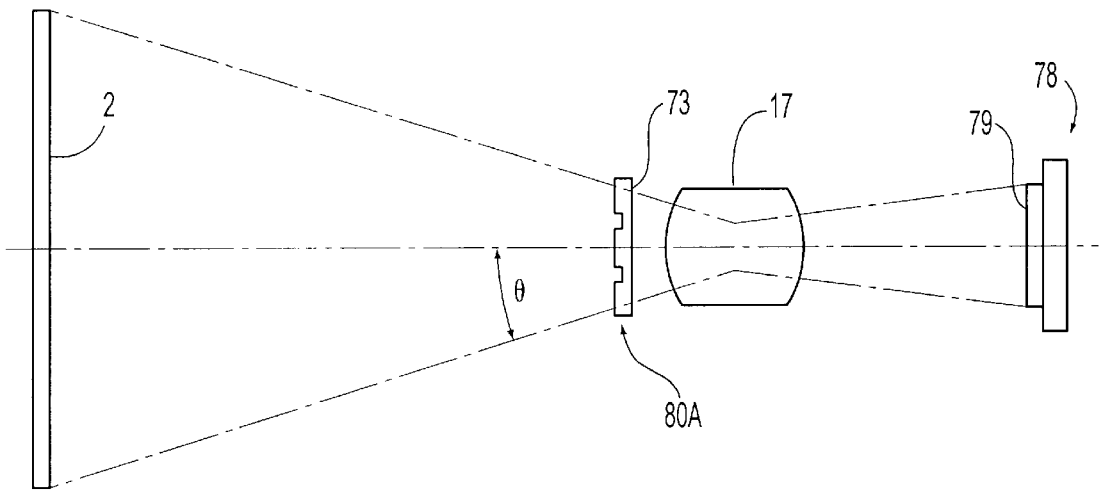
FIG. 20 is a side view of the main portions of a third embodiment of an image read apparatus according to the invention.
Figure 21:
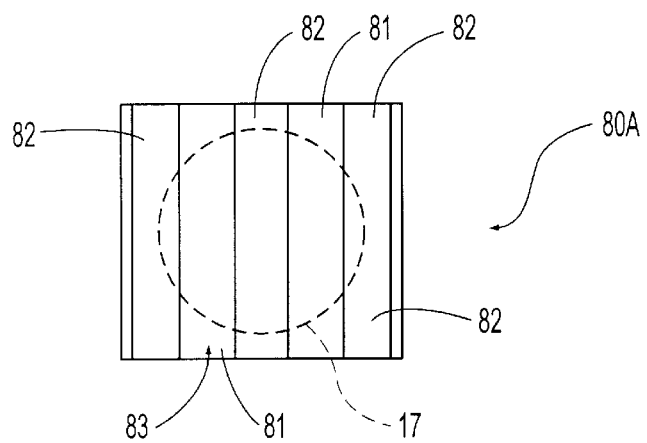
FIG. 21 is a front view of a diffraction grating used in the third embodiment of the invention.
Figure 22:
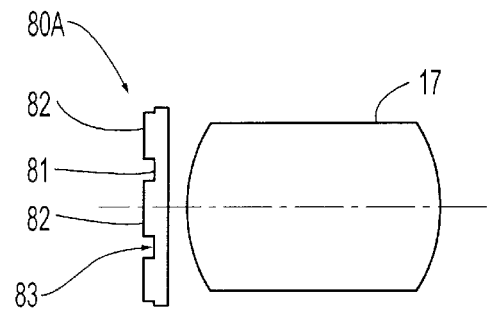
FIG. 22 is a top plan view of the arrangement of a diffraction grating used in the third embodiment with respect to a lens.

FIG. 20 shows a top plan view of an image read apparatus according to the third embodiment, in which, similarly to the above-mentioned modification of the second embodiment, a diffraction grating (lowpass filter) 80A is disposed on the platen glass 2 side of the lens 17. In the present embodiment, a CCD sensor 78 employs a solid state imaging device 79 which is a conventionally known device. As shown in FIGS. 21 and 22, the diffraction grating 80A includes on one surface thereof a parallel grating pattern 83 including recessed portions 81 and projected portions 82 which are formed alternately, while the grating pattern 83 is directed in the opposite direction to the lens 17, that is, it faces in a direction where the reflected light of the manuscript image is incident. In the grating pattern 83, the projected portions 82 are formed in the center and two end portions thereof, whereas the recessed portions 81 are formed between the projected portions 82. Also, the center of the central projected portion 82 is almost identical with the optical axis of the lens 17 and the extending direction of the grating pattern 83 intersects at right angles to the main scan direction.

Figure 25:
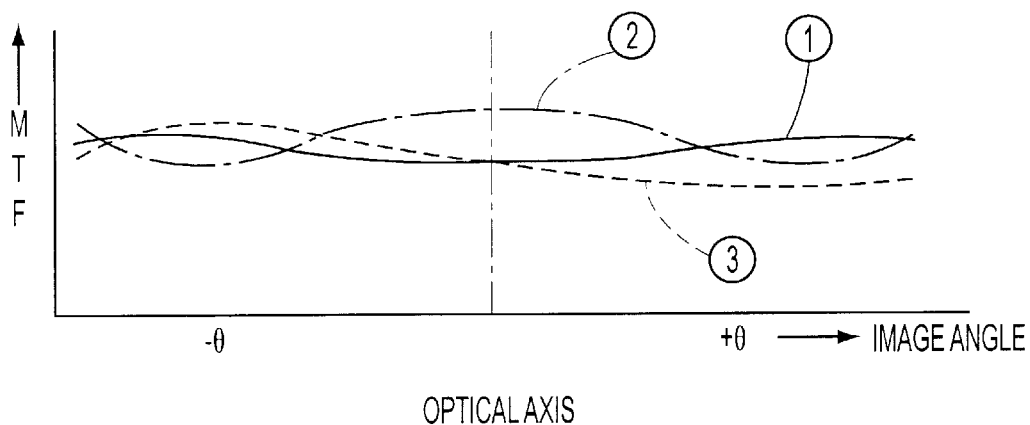
FIG. 25 is a graphical representation of the relation between the image angle of a lens and the MTF based on a difference between the arrangements of the grating patterns of a diffraction grid.

According to the present embodiment, since the center of the central projected portion 82 of the diffraction grating 80A is coincident with the optical axis of the lens 17, the effect of the diffraction grating 80A as a lowpass filter is substantially uniform with respect to the image angle of the lens 17, which makes it possible to standardize the MTF of the diffraction grating 80A with respect to the image angle of the lens 17. Also, due to the fact that the extending direction of the grating pattern 83 intersects at right angles to the main scan direction, the MTF in the main scan direction can be attenuated. Now, FIG. 25 shows a relation between the image angle of the lens 17 and the MTF in correspondence to the position of the grating pattern 83 with respect to the optical axis of the lens 17. As can be seen clearly from FIG. 25, when the center of a (1) projected portion 82 is present on the optical axis of the lens 17, the MTF is substantially uniform over the whole area of the image angle. On the other hand, in both cases where the center of a (2) recessed portion 81 is present on the optical axis of the lens 17 and where the boundary between a (3) recessed portion 81 and a projected portion 82 is present on the optical axis of the lens 17, the MTF varies greatly according to the image angle of the lens 17 and is not uniform over the whole image angle. Therefore, even when the pitch of the grating pattern 83 is not sufficient (when the diffraction grating 80 is disposed in front of the lens 17, the pitch is rough), generation of a moire can be restricted effectively. Also, as described before, when the diffraction grating 80A is disposed in front of the lens 17, then the precision and mounting precision of the diffraction grating 80A can be set comparatively rough as well as the space for the diffraction grating 80A can be saved, with the result that the cost of the image read apparatus can be reduced and the efficiency of the assembling operation thereof can also be improved.

Next, description will be given below of the modifications 1 and 2 of the above-mentioned third embodiment.

Figures 23A, 23B:
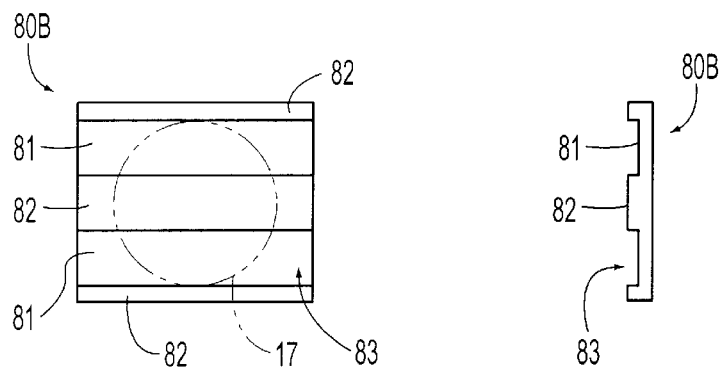
FIGS. 23a and 23b show a diffraction grating used in the modification 1 of the third embodiment; in particular.
Figure 24:
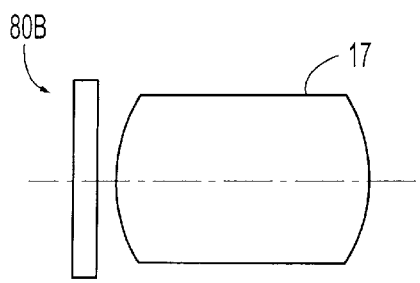
FIG. 24 is an top plan view of the arrangement of a diffraction grating used in the modification 1 of the third embodiment with respect to a lens.

(Modification 1 (FIGS. 23 and 24))

In the present modification 1, a diffraction grating (lowpass filter) 80B is disposed in such a manner that the extending direction of a grating pattern 83 composed of recessed portions 81 and projected portions 82 is parallel to the main scan direction. Similarly to the above-mentioned third embodiment, the center of the central projected portion 82 is substantially coincident with the optical axis of the lens 17.

According to the present structure, the MTF in the sub-scan direction can be attenuated. Here, in the sub-can direction, there is present a factor such as the vibration of a scanning system which causes the RGB data to be shifted. Therefore, for example, when a dot manuscript only in black and having a high frequency is read, if the reading resolution is high, then even the slight shift of the RGB data is judged as color information on an image process circuit and thus, when such RGB data are output by a-printer or the like, the image quality thereof can be deteriorated. In contrast, according to the present modification, since the MTF in the sub-scan direction can be attenuated, even if the RGB data are shifted slightly, such slight shift is difficult to be judged as color information in error, which makes it possible to obtain a printer output with no image quality deterioration.

Figure 26:
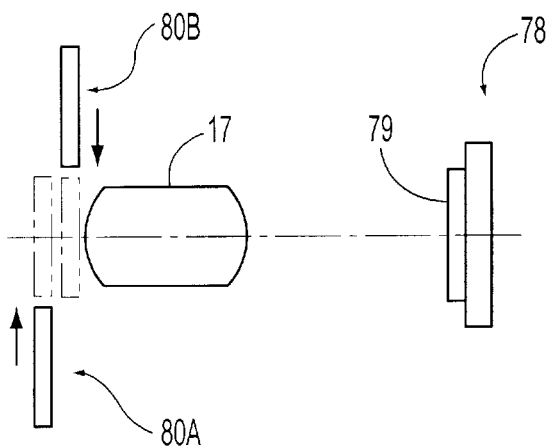
FIG. 26 is a top plan view of a modification 2 of the third embodiment.
Figure 27:
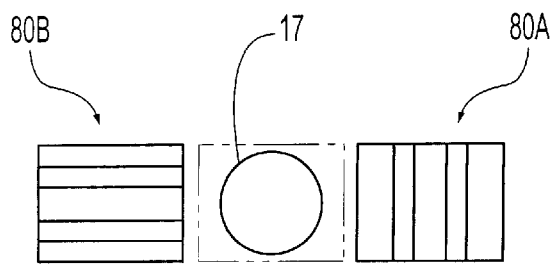
FIG. 27 is a front view of the modification 2 of the third embodiment.

(Modification 2 (FIGS. 26 and 27))

In the present modification, the above-mentioned two kinds of diffraction gratings 80A and 80B, the grating patterns 83 of which respectively extend in different directions intersecting each other at right angles, are disposed in front of the lens 17 in such a manner that they can be advanced and retreated with respect to the lens 17. In particular, when the two diffraction gratings 80A and 80B are advanced in front of the lens 17, the central projected portions 82 of the respective diffraction gratings 80A and 80B can be substantially coincident with the optical axis of the lens 17. Also, the two diffraction gratings 80A and 80B are made to advance in front of the lens 17, they are overlapped with each other in the optical axis direction and, in this case, the diffraction grating 80B is arranged on the lens 17 side.

According to the present structure, the respective diffraction gratings 80A and 80B are normally retreated from the front of the lens 17 and, according to information on the manuscript image, by advancing one of the diffraction gratings 80A and 80B in front of the lens 17, the most effective attenuation of the MTF can be achieved with respect to various kinds of manuscript images. For example, for a dot manuscript, only the diffraction grating 80B may be used, or both of the diffraction gratings 80A and 80B may be used. Also, when the lens 17 has such magnification that allows the sampling frequency to be coincident with the exciting frequency of a motor for driving of a scanning system, the diffraction grating BOB may be used. Further, for a generation copy, the diffraction grating 80A may be used. In this manner, by using one or both of the diffraction gratings 80A and 80B which are suitable for the manuscript images, the attenuation of the MTF is always possible, thereby being able to restrict occurrence of the deteriorated image quality such as a moire and the like.

According to the invention, not only an increase in the MTF in a specific direction can be restricted effectively but also, by setting the specific direction arbitrarily, it is possible to prevent the deteriorated image quality such as a moire, folding distortion, coloring, a blur and the like in all directions of the image formed, so that the image of high quality can be obtained at a low cost.

What is claimed is:

1. A solid state imaging device comprising:

a plurality of photosensitive pixels for scanning an optical image signal falling thereon and converting the same photoelectrically which are arranged in parallel to one another in a main scan direction, wherein said photosensitive pixels are respectively formed in a triangle or in a trapezoid, the two mutually adjoining ones of said photosensitive pixels are positioned in point symmetry in which said two mutually adjoining photosensitive pixels are rotated in 180° about a point from each other, and the oblique sides of two mutually adjoining photosensitive pixels are opposed to and in contact with each other, wherein the vertex of one mutually adjoining pixel and the base of another mutually adjoining pixel of said two mutually adjoining pixels, formed in a triangle or in a trapezoid, are present on a straight line along said main scan direction.

2. The solid state imaging device of claim 1, wherein the vertexes and bases of said two mutually adjoining photosensitive pixels, the upper bases, or the lower bases thereof are present on a straight line along said main scan direction.

3. A solid state imaging device comprising:

a first, a second, and a third photosensitive pixel for scanning an optical image signal falling thereon and converting the same photoelectrically which are arranged in parallel to one another in a main scan direction to form a photosensitive pixel line, a plurality of said photosensitive pixel lines being arranged in parallel to one another in the main scan direction, wherein at least one photosensitive pixel of said one photosensitive pixel line is formed in a triangle or in a trapezoid, and the remaining one or two pixels of said photosensitive pixel line are respectively formed in a slanted parallelogram, the oblique sides of two mutually adjoining pixels formed in a triangle or in a trapezoid being opposed to and in contact with each other, wherein the vertex of one mutually adjoining pixel and the base of another mutually adioiningz pixel of said two mutually adjoining pixels, formed in a triangle or in a trapezoid, are present on a straight line along said main scan direction.

4. The solid state imaging device of claim 3, wherein all angles of the pixels of the photosensitive pixel line are angles other than 90 degrees.

5. The solid state imaging device of claim 3, wherein said parallelogram-shaped photosensitive pixel reads an optical image of blue.

6. The solid state imaging device of claim 2, wherein the vertexes and bases of said two mutually adjoining photosensitive pixels, the upper bases, or the lower bases thereof are present on a straight line along said main scan direction.

7. The solid state imaging device of claim 5, wherein the vertexes and bases of said two mutually adjoining photosensitive pixels, the upper bases, or the lower bases thereof are present on a straight line along said main scan direction.

8. An image read apparatus comprising:

a solid state imaging device onto which the reflected light of an image illuminated by illuminating means is allowed to fall as an optical image signal, the optical image signal being scanned and converted photoelectrically by said solid state imaging device to thereby read the image, wherein said solid state imaging device includes;

a plurality of photosensitive pixels for scanning and photoelectrically converting an optical image signal falling thereon are arranged in parallel to each other in a main scan direction, said photosensitive pixels being respectively formed in a triangle or in a trapezoid, the two mutually adjoining ones of said photosensitive pixels being positioned in point symmetry in which said photosensitive pixels are rotated in 180° about a point from each other, and the oblique sides of said two mutually adjoining pixels being opposed to and in contact with each other, wherein the vertex of one mutually adjoining pixel and the base of another mutually adjoining pixel of said two mutually adjoining pixels, formed in a triangle or in a trapezoid, are present on a straight line along said main scan direction.

9. The image read apparatus of claim 8, wherein the vertexes and bases of said two mutually adjoining photosensitive pixels, the upper bases, or the lower bases thereof are present on a straight line along said main scan direction.

10. An image read apparatus comprising:

a solid state imaging device onto which the reflected light of an image illuminated by illuminating means is allowed to fall as an optical image signal, the optical image signal being scanned and converted photoelectrically by the solid state imaging device to thereby read the image, wherein said solid state imaging device includes;

a first, a second, and a third photosensitive pixel for scanning the optical image signal falling thereon and converting the same photoelectrically which are arranged in parallel to one another in a main scan direction to form a photosensitive pixel line, a plurality of said photosensitive pixel lines being arranged in parallel to one another in the main scan direction, and at least one photosensitive pixel of said one photosensitive pixel line is formed in a triangle or in a trapezoid, and the remaining one or two pixels of said photosensitive pixel line are respectively formed in a slanted parallelogram, and the oblique sides of two mutually adjoining pixels formed in a triangle or in a trapezoid are opposed to and in contact with each other, wherein the vertex of one mutually adjoining pixel and the base of another mutually adjoining pixel of said two mutually adjoining pixels, formed in a triangle or in a trapezoid, are present on a straight line along said main scan direction.

11. The image read apparatus of claim 10, wherein the vertexes and bases of said two mutually adjoining photosensitive pixels, the upper bases, or the lower bases thereof are present on a straight line along said main scan direction.

12. The image read apparatus of claim 10, wherein said parallelogram-shaped photosensitive pixel reads an optical image of blue.

13. The image read apparatus of claim 12, wherein the vertexes and bases of said two mutually adjoining photosensitive pixels, the upper bases, or the lower bases thereof are present on a straight line along said main scan direction.

* * * * *